Patented Nov. 4, 1941

2,261,758

UNITED STATES PATENT OFFICE 2,261,758

IMPREGNATED POROUS ARTICLE

Charley Gustafsson, Helsingfors, Finland, assignor to Johan Bjorksten

No Drawing. Application March 21, 1938, Serial No. 197,201

5 Claims. (Cl. 91—68)

This invention relates to an improved method for treating and impregnating wood, fiber board and similar fibrous and porous materials with a preserving agent obtained from hydrocarbon oils. This invention relates more particularly to a preserving agent which is exceptionally resistant to humid conditions, and which readily permits the superposition of paints.

The most efficient and extensively used processes now in use for the preservation of wood are based on impregnation with either zinc chloride or creosote oil. However, in humid conditions the effect of a zinc chloride treatment will soon be impaired, due to the fact that this impregnation agent is readily soluble in water, and thus will be removed by prolonged or repeated contact with water, or moisture. In a lesser degree the same applies to creosote oils which are also soluble in water to some extent. Because of this water solubility, these materials will be washed out over a period of time, particularly when in constant contact with water, as is the case in partly submersed structures such as bridges, quays, wooden vessels and the like.

Also, creosote or tar impregnated wood is not adapted to being painted due to the poor adhesion of paints to timber treated with creosote or tar preparations.

An object of the present invention is to provide an impregnated wood, more permanently resistant to the action of organic life than has heretofore been possible.

Another object of this invention is to permanently protect wood from the action of wood attacking organisms such as fungi, bacteria, shipworms, termites, and the like.

A further object of this invention is to provide a wood impregnating and protecting agent of extreme resistance to moisture.

Another object of this invention is to provide wood which has been impregnated with a disinfectant, but still retains its adaptability of being painted or varnished.

Further objects and advantages will become apparent from the following detailed description of the invention.

It has been found that a synthetic petroleum product obtained by chlorination of a cracked petroleum fraction boiling below 300° C., preferably between 30° and 140° C. at atmospheric pressure, and subsequent condensation of this product by use of Friedel-Crafts type catalysts is extremely suitable for treating wood, fibrous and porous materials to render them resistant to attacks by those forms of organic life which ordinarily attack such materials. This reaction product is obtainable at a cost lower than that of creosote oils by a process which does not involve distillation, extraction or similar purification processes. Methods for preparing these reaction products are disclosed and claimed in the copending application, Serial No. 364,752; filed Nov. 7, 1940, of Richard Waller and Charley Gustafsson. These synthetic petroleum products are miscible with petroleum solvents, such as naphtha, and insoluble in water, lower alcohols and acetone.

This reaction product, when exposed to air, dries, leaving a tenacious film which possesses excellent adhesive properties, which is water resistant, and which is highly toxic or repellant to those forms of organic life which ordinarily attack wood and the like. This toxic or repellant effect may be due to the chlorine content of the composition.

The product may be applied to the material to be protected by means well known in the art, such as a simple application by brush or by immersion or spraying, as well as by pressure or vacuum impregnation at ordinary or elevated temperatures.

Although the protective properties of the film is very great, it may be desired for some specific application to further enhance these properties. For this purpose other toxic or repellant substances may be incorporated in the composition, such as organic materials, for example ortho chlor mercuri phenol or other organic mercurials, p-chlor m-cresol, tri chlor phenol, p-nitro phenol, beta naphthol, o-phenyl phenol, thymol, cresol chlor thymols, phenol, or inorganic materials, for example sodium silico fluoride, mercuric chloride, and the like. Usually these substances are employed in quantities of from 0.02% to 0.2%.

To illustrate the application of this invention the following specific examples may be given:

Example 1

100 parts of a fraction of vapor phase cracked petroleum, boiling between 30 degrees and 220 degrees centigrade, and having a bromine number of approximately 0.561 and a specific gravity of approximately 0.861 is chlorinated by gaseous chlorine. During the chlorination process the mixture is continually cooled, the temperature being maintained below 50° C. During the chlorination process some hydrogen chloride is generated, and may be recovered by means well known to the art. The chlorination process is arrested when the temperature begins to decrease spontaneously, indicating that chlorination is completed of those constituents which most avidly absorb the chlorine. The chlorine content of the reaction product is then about 30%, the specific gravity approximately 1.1.

130 parts of the clear, light brown reaction product are gradually intermixed with 6 parts of anhydrous, finely pulverized aluminum chloride, whereby a reaction takes place. When this reaction has ceased, which is apparent from the fact that no more heat is being generated, the mixture is heated on steam bath for about 45 minutes. More hydrogen chloride is given off during this heating period, and may be recovered by means well known to the art.

The reaction product is allowed to cool. 33 parts of a cracked petroleum fraction of the same type as that originally used, or of some other suitable thinning solvent, are then added. The resulting mixture is washed with water to remove the aluminum chloride, and then dried with a dehydrating agent such as calcium chloride. The yield is approximately 118 parts of a dark brown, oily fluid, which contains approximately 45% of solid resin. When this fluid is applied to a surface it dries within 15 minutes to a tacky film, which in 12 hours hardens to a tenacious hard film of excellent adhesion to glass, metals and wood.

This fluid may be further chlorinated with gaseous chlorine, whereby its color becomes lighter and its toxic and repellant properties are further enhanced. However, this further chlorination is not essential to the invention, and for most purposes I prefer to dispense therewith.

*Example 2*

The dark brown, oily fluid prepared by the procedure of Example 1 is applied to wood with a brush. This fluid penetrates readily, and possesses excellent parasite repelling properties. The wood thus treated can be painted readily, and will retain such paint coatings indefinitely, in contradistinction to wood impregnated with creosote or with zinc chloride.

*Example 3*

Wood or the like is immersed in the dark brown, oily fluid prepared by the procedure of Example 1, and then subjected to reduced pressure. When this reduced pressure has caused removal of the air from the pores and interstices in the wood, normal pressure is again restored, whereby the fluid is forced into the evacuated pores and interstices of the wood, by the air pressure. In this manner, a greater depth of impregnation is obtained, and the effect is, therefore, even more lasting than that obtained in Example 2. Other impregnation methods are also suitable, as will be understood by those skilled in the art.

*Example 4*

0.2% of phenol is dissolved in the dark brown, oily fluid prepared by the procedure of Example 1. Wood is impregnated with the resulting phenol containing fluid according to the procedures of either Examples 2 or 3.

*Example 5*

The dark brown, oily fluid prepared by the procedure of Example 1 is subjected to distillation to remove the volatile components. The resulting residue is dried in a vacuum at a temperature of 150° C. A resin is obtained which can be dissolved in petroleum solvents, such as solvent naphtha. The resins so obtained are insoluble in water, lower alcohols and acetone. Solutions of this resin may be employed in the same manner as the dark brown, oily fluid of the preceding examples in the treatment of wood, fiber, wallboard and the like.

Although it is apparent from the above examples that it is unnecessary to first form the resin, it may be desirable to do so for some purposes.

Although the foregoing examples have been directed to the treatment of wood, it is to be understood that the present invention also contemplates the treatment of other fibrous or porous materials which may be subject to attack by organisms such as termites, shipworms, bacteria, fungi, and the like. Examples of such materials are cork, wallboards, vegetable fibers, and compounded products comprising organic materials. The materials and/or the products may be fibrous or porous in nature.

For some specific purposes, it may be advantageous to alter the physical characteristics of the impregnating material by the admixture of such modifying agents as are well known to those skilled in the art, such as drying oils, for example, tung oil, oiticica oil, and the like, or waxes, for example, paraffin wax, carnauba wax, hydrogenated oils, or other desired materials.

It is to be understood that this invention is not to be limited to any of the foregoing examples, the specific examples having been given solely for illustrative purposes.

I claim:

1. An article of manufacture comprising a fibrous material impregnated with a composition of matter comprising the product of the process of chlorinating, substantially to saturation, a vapor phase cracked hydrocarbon material of petroleum origin, distillable below 300° C. at atmospheric pressure, and polymerizing the chlorinated material by the use of a Friedel-Crafts type catalyst without the addition of non-chlorinated or partly chlorinated materials prior to the polymerization step, and a coat of paint covering the said impregnated material.

2. An article of manufacture comprising a fibrous material impregnated with a composition of matter comprising the product of the process of chlorinating, substantially to saturation, a vapor phase cracked hydrocarbon material of petroleum origin, distillable below 300° C. at atmospheric pressure, and polymerizing the chlorinated material by the use of a Friedel-Crafts type catalyst without the addition of non-chlorinated or partly chlorinated material prior to the polymerization step, and removing the catalyst and also the volatile constituents from the polymerized material; and a coat of paint covering the said impregnated material.

3. An article of manufacture comprising a fibrous material impregnated with a composition of matter comprising the product of the process consisting essentially of chlorinating, substantially to saturation, a distillate of a vapor phase cracked petroleum product, said distillate being substantially unsaturated and having a boiling range below 300° C. at atmospheric pressure, and polymerizing the chlorinated material by the use of a Friedel-Crafts type catalyst; and a coat of paint covering the said impregnated material.

4. An article of manufacture comprising wood impregnated with a composition of matter comprising the product of the process consisting essentially of chlorinating, substantially to saturation, a distillate of a vapor phase cracked petroleum product, said distillate being substantially unsaturated and having a boiling range below 300° C. at atmospheric pressure, and polymerizing the chlorinated material by the use of a Friedel-Crafts type catalyst; and a coat of paint covering the said impregnated wood.

5. An article of manufacture comprising a fibrous base material impregnated with a composition of matter comprising a phenolic toxic material, and also comprising the product of the process consisting essentially of chlorinating, substantially to saturation, a distillate of a vapor phase cracked petroleum product, said distillate being substantially unsaturated and having a boiling range below 300° C. at atmospheric pressure, and polymerizing the chlorinated material by the use of a Friedel-Crafts type catalyst.

CHARLEY GUSTAFSSON.